United States Patent
Wallet et al.

(10) Patent No.: US 9,873,291 B2
(45) Date of Patent: *Jan. 23, 2018

(54) IRRIGATION TIRE

(71) Applicant: Bridgestone Americas Tire Operations, LLC, Nashville, TN (US)

(72) Inventors: Bill J. Wallet, Marshallville, OH (US); John J. Regallis, Akron, OH (US); Jeffrey D. Parker, Copley, OH (US); Nobuo Shimizu, Tokyo (JP); Andrew T. Miklic, Akron, OH (US); Keith A. Dumigan, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/460,261

(22) Filed: Mar. 16, 2017

(65) Prior Publication Data

US 2017/0182848 A1    Jun. 29, 2017

Related U.S. Application Data

(63) Continuation of application No. 15/189,258, filed on Jun. 22, 2016, now Pat. No. 9,649,886, which is a (Continued)

(51) Int. Cl.
*B60C 11/11*    (2006.01)
*B60C 11/03*    (2006.01)
(Continued)

(52) U.S. Cl.
CPC ............ *B60C 11/0316* (2013.01); *B60C 1/00* (2013.01); *B60C 3/04* (2013.01); *B60C 11/032* (2013.01);
(Continued)

(58) Field of Classification Search
CPC ..................... B60C 11/0311; B60C 11/0316
See application file for complete search history.

(56) References Cited

U.S. PATENT DOCUMENTS

| D57,340 S | 3/1921 | Hudson |
| D57,878 S | 5/1921 | Waters |

(Continued)

FOREIGN PATENT DOCUMENTS

| DE | 1009954 | 6/1957 |
| DE | 1009954 B * | 6/1957 |

(Continued)

OTHER PUBLICATIONS

Firestone 5.00-15 Power Implement Tire, 3 pages (undated but admitted to be prior art in IDS filed Mar. 17, 2017).*

(Continued)

*Primary Examiner* — Steven D Maki

(57) ABSTRACT

A non directional pneumatic tire is provided for an agricultural irrigation system. The tire includes first and second side walls and a radially outer wall defining an internal inflation chamber. A non directional tread pattern is defined on the tire and includes a plurality of longitudinal protrusions positioned substantially parallel to a rotational axis of the tire. The longitudinal protrusions are arranged in first and second rows extending from the first and second side walls toward and across the equatorial plane of the tire. The longitudinal protrusions of the first and second rows circumferentially alternate with each other and there is a circumferential spacing between adjacent longitudinal protrusions at the equatorial plane so that no portion of one longitudinal protrusion circumferentially coincides with or overlaps another.

20 Claims, 11 Drawing Sheets

Related U.S. Application Data continuation of application No. 14/822,954, filed on Aug. 11, 2015, which is a continuation of application No. 11/865,085, filed on Oct. 1, 2007, now Pat. No. 9,108,469.

(51) Int. Cl.
  *B60C 1/00* (2006.01)
  *B60C 3/04* (2006.01)
  *B60C 13/00* (2006.01)
  *B60C 11/13* (2006.01)

(52) U.S. Cl.
  CPC ........ *B60C 11/033* (2013.01); *B60C 11/0304* (2013.01); *B60C 11/0311* (2013.01); *B60C 11/0332* (2013.01); *B60C 11/1307* (2013.01); *B60C 13/00* (2013.01); *B60C 2011/0388* (2013.01); *B60C 2200/08* (2013.01)

(56) References Cited

U.S. PATENT DOCUMENTS

| | | | |
|---|---|---|---|
| 1,460,247 A | 6/1923 | Johnson | |
| D64,632 S | 9/1923 | Grubb | |
| D85,055 S | 9/1931 | Reichard | |
| D99,597 S | 5/1936 | Caldwell | |
| D104,503 S | 5/1937 | Partenheimer | |
| D120,687 S | 5/1940 | Moonan | |
| D155,065 S | 9/1949 | Bete | |
| D157,118 S | 2/1950 | Anderson | |
| D168,494 S | 12/1952 | Beckman | |
| D168,675 S | 1/1953 | Custer | |
| 2,626,649 A | 1/1953 | Eiler et al. | |
| D169,835 S | 6/1953 | Billingsley | |
| D170,873 S | 11/1953 | Kaufman | |
| 3,196,920 A | 3/1964 | Fishman | |
| 3,155,436 A | 11/1964 | Bonmartini | |
| 3,237,669 A | 3/1966 | Travers | |
| D211,552 S | 6/1968 | Cvengros | |
| 3,423,348 A | 1/1969 | Eigenfeld et al. | |
| 3,457,981 A | 7/1969 | Verdier | |
| D219,799 S | 1/1971 | Sons, Jr. | |
| 3,603,370 A | 9/1971 | Hylbert et al. | |
| D225,041 S | 10/1972 | Marick | |
| 3,770,038 A | 11/1973 | Wolfe | |
| 3,844,326 A | 10/1974 | Verdier | |
| 3,939,890 A | 2/1976 | Abe | |
| 3,945,871 A | 3/1976 | Schelkmann | |
| 4,186,788 A | 2/1980 | Pommier | |
| D256,008 S | 7/1980 | Menin | |
| D260,872 S | 9/1981 | Wright et al. | |
| D274,232 S | 6/1984 | Kohno et al. | |
| 4,480,672 A | 11/1984 | Marshall et al. | |
| 4,534,392 A | 8/1985 | Bonko et al. | |
| 4,574,857 A | 3/1986 | Beeghly et al. | |
| 4,611,647 A | 9/1986 | Rimondi | |
| D288,426 S | 2/1987 | Konishi et al. | |
| 4,687,261 A | 8/1987 | Atkin | |
| 4,703,079 A | 10/1987 | Ahma et al. | |
| 4,727,917 A | 3/1988 | Stewart | |
| 4,791,971 A | 12/1988 | Shinn | |
| D303,365 S | 9/1989 | Bonko | |
| D303,366 S | 9/1989 | Bonko | |
| D303,367 S | 9/1989 | Bonko et al. | |
| D303,779 S | 10/1989 | Bonko | |
| D304,320 S | 10/1989 | Bonko | |
| 4,881,586 A | 11/1989 | Shinomiya | |
| D308,038 S | 5/1990 | Guidry | |
| D309,125 S | 7/1990 | Bonko et al. | |
| D312,064 S | 11/1990 | Duncan | |
| 4,982,773 A | 1/1991 | Bonko | |
| D315,126 S | 3/1991 | Baus | |
| 5,010,935 A | 4/1991 | Bonko et al. | |
| D317,144 S | 5/1991 | Fujiki | |
| 5,056,573 A | 10/1991 | O'Brien et al. | |
| D333,453 S | 2/1993 | Cook et al. | |
| 5,188,683 A | 2/1993 | Bonko | |
| 5,238,991 A | 8/1993 | Magnus et al. | |
| 5,259,429 A | 11/1993 | Harms | |
| D342,927 S | 1/1994 | Thomas | |
| 5,279,378 A | 1/1994 | Grawey et al. | |
| D345,950 S | 4/1994 | Guidry | |
| 5,337,814 A | 8/1994 | Bonko | |
| 5,337,816 A * | 8/1994 | Bonko | B60C 11/0311 152/209.12 |
| 5,363,936 A | 11/1994 | Grawey et al. | |
| 5,407,005 A | 4/1995 | Consolacion et al. | |
| 5,421,388 A | 6/1995 | Bonko et al. | |
| D363,907 S | 11/1995 | Bonko | |
| 5,464,050 A | 11/1995 | Bonko | |
| D367,448 S | 2/1996 | Baus et al. | |
| D367,631 S | 3/1996 | Bonko | |
| D377,923 S | 2/1997 | Bonko | |
| D383,426 S | 9/1997 | Guidry | |
| D385,519 S | 10/1997 | de Briey-Terlinden et al. | |
| D388,844 S | 1/1998 | Bonko | |
| D390,178 S | 2/1998 | Maxwell | |
| D390,189 S | 2/1998 | Stadler | |
| 5,733,393 A | 3/1998 | Hubbell et al. | |
| 5,733,394 A | 3/1998 | Baus et al. | |
| D400,141 S | 10/1998 | Maxwell | |
| D402,245 S | 12/1998 | Bonko et al. | |
| D403,284 S | 12/1998 | Le | |
| 5,843,248 A | 12/1998 | Baus et al. | |
| 5,901,765 A | 5/1999 | Bonko | |
| D412,302 S | 7/1999 | Rayman et al. | |
| D413,557 S * | 9/1999 | Bonko | D12/579 |
| D415,722 S | 10/1999 | Weed et al. | |
| 6,179,027 B1 | 1/2001 | Shimizu | |
| 6,207,602 B1 | 3/2001 | Gessner et al. | |
| D444,110 S | 6/2001 | Umstot et al. | |
| 6,250,353 B1 | 6/2001 | Maxwell | |
| 6,260,594 B1 | 7/2001 | Bonko et al. | |
| 6,263,933 B1 | 7/2001 | Baus | |
| D446,479 S | 8/2001 | Bonko | |
| D450,020 S | 8/2001 | Bonko | |
| 6,311,752 B1 | 11/2001 | Hojo | |
| 6,386,652 B1 | 5/2002 | Bonko | |
| 6,450,221 B1 | 9/2002 | Bonko | |
| 6,530,405 B1 | 3/2003 | Brown et al. | |
| 6,536,490 B2 | 3/2003 | Rooney | |
| D483,718 S | 12/2003 | Hutz et al. | |
| D488,769 S | 4/2004 | Guidry | |
| D499,066 S | 11/2004 | Covey | |
| D499,691 S | 12/2004 | Brown et al. | |
| D499,692 S | 12/2004 | Brown et al. | |
| D501,181 S | 1/2005 | Brown et al. | |
| D505,108 S | 5/2005 | Bonko et al. | |
| 6,929,044 B1 | 8/2005 | Rooney | |
| D548,674 S | 8/2007 | Nishimori et al. | |
| D560,596 S | 1/2008 | Sakakibara et al. | |
| D610,072 S | 2/2010 | Wallet et al. | |
| D612,799 S | 3/2010 | Wallet et al. | |
| D621,778 S | 8/2010 | Pringiers | |
| D636,721 S | 4/2011 | Wallet et al. | |
| 8,056,202 B2 | 11/2011 | Allen et al. | |
| D664,914 S | 8/2012 | Dixon et al. | |
| 9,108,469 B2 * | 8/2015 | Wallet | B60C 11/0311 |
| 9,649,886 B2 * | 5/2017 | Wallet | B60C 11/0311 |
| 2002/0157749 A1 | 10/2002 | Neumann | |
| 2003/0024621 A1 | 2/2003 | Neugebauer et al. | |
| 2004/0099359 A1 | 5/2004 | Bonko | |
| 2004/0149365 A1 | 8/2004 | Yamazaki et al. | |
| 2005/0167020 A1 | 8/2005 | Rooney | |
| 2013/0276946 A1 | 10/2013 | Wallet et al. | |

FOREIGN PATENT DOCUMENTS

| | | |
|---|---|---|
| EP | 0903249 A1 | 3/1999 |
| EP | 1172234 A2 | 1/2002 |
| EP | 1698456 | 9/2006 |
| GB | 186893 | 3/1923 |
| GB | 505994 | 5/1939 |
| GB | 1586721 | 3/1981 |

(56) References Cited

FOREIGN PATENT DOCUMENTS

| | | |
|---|---|---|
| JP | S58-090804 | 6/1983 |
| JP | 59-063201 | 4/1984 |
| JP | S63-17104 | 1/1988 |
| JP | 63-212102 | 9/1988 |
| JP | 64-28008 A | 1/1989 |
| JP | 06-57487 | 8/1994 |
| JP | 06-057487 B2 * | 8/1994 |
| JP | 08-34209 | 2/1996 |
| JP | 10-338007 | 12/1998 |
| JP | 2000-289421 | 10/2000 |
| JP | 2000-289421 A * | 10/2000 |
| JP | 2002-050894 | 4/2002 |
| JP | 2002-509824 | 4/2002 |
| WO | 84/03665 | 9/1984 |
| WO | 98/33669 | 8/1998 |
| WO | 99/15348 | 4/1999 |
| WO | 0013921 A1 | 3/2000 |

OTHER PUBLICATIONS

Machine translation for Japan 2000-289421 (no date).*
Machine translation for Japan 06-057487 B2 (no date).*
Machine translation for Germany 1009954 (no date).*
Exhibit B: "Bridgestone Corporation AGS 650X100 C R25LM", four pages, obtained from parent U.S. Appl. No. 11/865,085, undated but admitted to be prior art in parent U.S. Appl. No. 11/865,085.*
Exhibit F1: photgraphs of a Firestone 5.00-15 Power Implement Tire, two pages, obtained from parent U.S. Appl. No. 11/865,085, undated but admitted to be prior art in parent U.S. Appl. No. 11/865,085.*
Exhibit F2: drawing of the Firestone 5.00-15 Power Implement Tire of Exhibit F1, one page, obtained from parent U.S. Appl. No. 11/865,085, undated but admitted to be prior art in parent U.S. Appl. No. 11/865,085.*
Notification of the First Office Action in corresponding Chinese Patent Application No. 20140398330.0 with English translation, dated Dec. 23, 2015, 8 pp. (not prior art).
English translation of Office Action in corresponding Mexican Patent Application No. MX/a/2010/003590, 5pp. (not prior art).
European Search Report in corresponding European Patent Application No. EP 08 835 176.2, dated Apr. 22, 2016, 4 pp. (not prior art).
Notification of the Second Office Action in corresponding Chinese Patent Application No. 20140398330.0 with English translation, dated Aug. 15, 2016, 9 pp. (not prior art).
Machine translation for Japan 64-028008 (no date).
Machine Translation for JP 06-057487 (no date).
Machine Translation for JP 08-034209 (no date).
Machine Translation for JP 10-338007 (no date).
Firestone 5.00-15 Power Implement Tire, drawing, 1 page, (undated but admitted to be prior art).
Ohtsu Tire & Rubber Co. Ltd. (Arimura Kageyuki); Patent Abstract (English) for JP-S63-017104; Jan. 25, 1988; pp. 1-1; Japanese Patent Office; Japan.
Balazs, Matthias; European Search Report and Written Opinion; Jun. 21, 2013; pp. 1-8; European Patent Office; Munich, Germany.
Tirerack.com; Rubber Cracking; Online Article; Jan. 10, 2010; pp. 1-1; Tirerack.com.
Jung Seok Kang, International Preliminary Report on Patentability and Written Opinion from corresponding PCT application PCT/US2008/011302, Apr. 7, 2010, 7 pages, Korean Intellectual Property Office, Seonsa-ro, Seo-gu, Daejeon, Korea.
Bill J. Wallet et al., Tire Tread, Design U.S. Appl. No. 29/355,659, filed Feb. 11, 2010, 8 pages, United States.
Machine Translation for JP 2000-289421 (no date).
Ex. 1A: U.S. Appl. No. 13/772,455, filed Feb. 21, 2013 (not prior art).
Ex. 1B: Office Action dated Jun. 9, 2014 in U.S. Appl. No. 13/772,455 (not prior art).
Ex. 1C: Response to Office Action dated Sep. 2, 2014 in U.S. Appl. No. 13/772,455 (not prior art).
Ex. 1D: Office Action dated Sep. 25, 2014 in U.S. Appl. No. 13/772,455 (not prior art).
Ex. 1E: Declaration of Express Abandonment filed Jan. 27, 2015 in U.S. Appl. No. 13/772,455 (not prior art).
Ex. 2A: Design U.S. Appl. No. 29/465,671 filed Aug. 30, 2013 (not prior art).
Ex. 2B: Office Action dated Feb. 28, 2014 in Design U.S. Appl. No. 29/465,671 (not prior art).
Ex. 2C: Amendment and response dated Mar. 25, 2014 in Design U.S. Appl. No. 29/465,671 (not prior art).
Bridgestone Corporation, "Bridgestone Corporation AGS 650X100 C R25LM," drawings, 4 pages, (undated but admitted to be prior art).
Photographs of a Firestone 67x34.00-25 Flotation 23 Deep Tread Logger Tire, 9 pages, (undated but admitted to be prior art).
Firestone Tire, "Firestone Flotation 23 Deep Tread Logger Tire," brochure, 1 page, (undated but admitted to be prior art).
Photograph of a Firestone 16.9R28 Radial Champ Spade Grip Tire, 1 page, (undated but admitted to be prior art).
Firestone Tire, "Firestone Radial Champ Spade Grip Tire," brochure, (undated but admitted to be prior art).
Photograph of Firestone 18.4-38 Champ Spade Grip Tire, 1 page, (undated but admitted to be prior art).
Photographs of a Firestone 5.00-15 Power Implement Tire, 2 pages (undated but admitted to be prior art).
Firestone Tire, "Firestone Power Implement Tires," brochure, (undated but admitted to be prior art).
Two tires of interest: (1) Dico—Premium Wide Trac TL-N and (2) Dynastar—IndustrialDeep Lug TT-N. (undated but admitted to be prior art).
One Tire of Interest: General—Deep Mine Lug (Industrial)(NHS). (undated but admitted to be prior art).
One Tire of Interest: Toyo G-25EDT (E-4) TL-N. (undated but admitted to be prior art).
Ex. 2D: Final Office Action dated Apr. 24, 2014 in Design U.S. Appl. No. 29/465,671 (not prior art).
Ex. 2E: Response to Final and Rule 132 Declaration filed Jun. 23, 2014 in U.S. Appl. No. 29/465,671 (not prior art).
Ex. 2F: Advisory Action dated Jul. 9, 2014 in Design U.S. Appl. No. 29/465,671 (not prior art).
Ex. 2G: Notice of Appeal and Preliminary Appeal Brief Request of Aug. 21, 2014 in Design U.S. Appl. No. 29/465,671 (not prior art).
Ex. 2H: Office Action dated Dec. 1, 2014 in Design U.S. Appl. No. 29/465,671 (not prior art).
Ex. 2I: Response to Final and Second Rule 132 Declaration filed Feb. 27, 2015 in Design U.S. Appl. No. 29/465,671 (not prior art).
Ex. 2J: Office Action dated May 12, 2015 in Design U.S. Appl. No. 29/465,671 (not prior art).
Patent Examination Report No. 1, dated Jun. 15, 2012, 3 pp. (from corresponding AU 2008307581) (not prior art).
Response to Patent Examination Report No. 1m dated Aug. 20, 2012, 22 pp. ( from corresponding AU 2008307581) (not prior art).
"Notice of Acceptance" dated Aug. 24, 2012, 1 pg. (from corresponding AU 2008307581) (not prior art).
Firestone Tire, "Current Traction Field and Road," sales brochure (undated but admitted to be prior art).

* cited by examiner

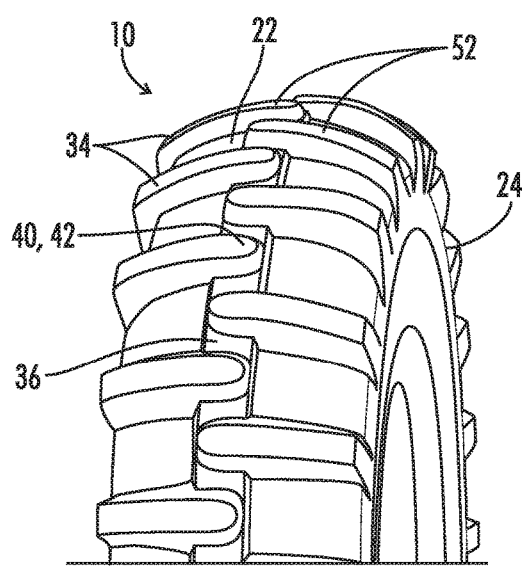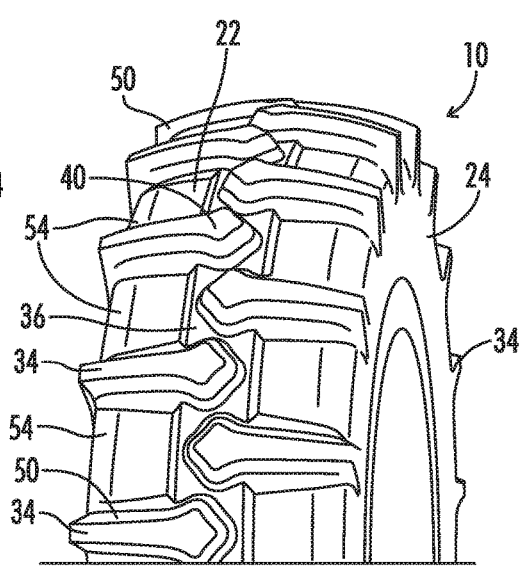
*FIG. 1*   *FIG. 2*

(MOLD)
(FOR FINISH MOLD ONLY)

IRRIGATION TIRE

BACKGROUND OF THE INVENTION

Field of the Invention

The present invention relates generally to tires and to non-directional tires used in agricultural settings. More specifically, but without limitation, the present invention relates to non-directional pneumatic tires designed to support agricultural irrigation systems.

Technical Background

The development of specific tires to fill a specific need for various wheeled devices is well known in the art. Most of this focus has been directed at the development of tires for vehicles, such as automobiles, wherein those tires are designed to spend a great majority, if not all, of their useful life on paved surfaces.

Another area of conventional tire development is the "off-road" tire that is used on various "off-road" vehicles such as trucks, SUV's, and similar vehicles, where those "off-road" vehicles spend most of their time on paved surfaces and a smaller portion of their time on non-paved surfaces. However, most of these "off-road" tires have a specific direction of rotation designed into the "off-road" tire. This is due to the fact that these "off-road" vehicles have a preferred forward direction of movement, which corresponds into a specific preferred direction of rotation designed directly into the prior art "off-road" tires. This preferred direction of rotation for the tire leads to tire designs having characteristics, such as tread pattern, that cause the tire to specifically perform better when the tire is rotated in a specific direction. For example, the "off-road" tires perform significantly better when rotated in a forward direction with respect to the vehicle versus a backwards direction with respect to the vehicle.

These prior art tires have several drawbacks for vehicles that spend any significant amount of time moving in both forward and backward directions. For example, these prior art tires result in an uncomfortable and turbulent movement to the vehicle supported by those prior art tires when moved in a reverse direction. A majority of this turbulence is due to the specific tread pattern on these prior art tires and the orientation of the various elements, commonly referred to as lugs, on the tread pattern.

Additionally, the prior art single directional tires also require different mounting techniques for each side of the vehicle. These multiple mounting techniques are normally necessitated by the fact that the tread of these single directional tires is designed to operate in a specific orientation with respect to the direction of travel of the vehicle. As such, these single directional tires must be properly oriented with respect to the wheel on which these tires are mounted and more specifically to the side of the wheel that is to be mounted on the vehicle.

The field of agriculture is one area in which the apparatus, or vehicle, supported by wheels and tires can benefit from tires that are designed to traverse the ground with substantial similarity in both forward and backward directions (i.e., non-directional tires). Additionally, tires for agricultural apparatus normally are enhanced by a tread pattern that is specifically designed for use on non paved surfaces. A substantial portion of agricultural devices, such as tractors, trailers, crop planting devices, crop harvesting devices, and the like, are used in locations, such as agricultural fields, when it is undesirable for the agricultural device to substantially alter the ground upon which they move.

One type of agricultural apparatus in particular that is normally positioned in an agricultural field, can benefit from non-directional tires, and preferably does not substantially damage or alter the ground upon which it moves is an irrigation system. Tires possessing non-directional capability can substantially improve the operation of the agricultural apparatus in the event the normal direction of travel is reversed. More importantly, tires so designed, can shorten the tire and wheel installation time required for the agricultural apparatus. This is due to the fact that a non-directional tire can reduce the need for multiple mounting techniques between the wheel and the apparatus. As such, a single mounting can be used for all of the wheel mounts regardless of their orientation with respect to the direction of travel of the apparatus. Additionally, the installation person would not be required to specifically align a non-directional tire with respect to the wheel used on an irrigation system, as would be required for a single directional tire.

As such, irrigation tires positioned on the irrigation system should be designed to move in either direction with similar ease, possess the proper dimensions to adequately support the weight of the irrigation system, including weight of the water supported by the irrigation system, and be designed to be light enough and have the proper tread pattern to refrain from, or minimally alter, the ground over which the irrigation system travels.

Most conventional irrigation tires, and most conventional agricultural tires, have a tread pattern that is specifically designed for a single preferred direction of rotation. Most of these conventional tires have lugs that angle towards the center part of the tire and are not parallel with the axis of the tire. Additionally, a majority of the irrigation tires are comprised of solid rubber that is molded to the wheel of the irrigation system. These types of tires can be very heavy and damage the ground upon which the irrigation system traverses. Also, these irrigation tires do not contemplate altering the composite of the tires to specifically protect the tires against the weathering elements to which the tires are exposed during their useful life.

What is needed then is an irrigation tire that is designed for movement in multiple rotational directions, is comprised of materials designed to have a minimal impact on the ground to which the irrigation system traverses, is comprised of materials to lengthen the useful life of the tire and withstand weathering by the elements, and is designed to facilitate improved traction with the ground upon which it travels. This needed tire is lacking in the art.

BRIEF SUMMARY OF THE INVENTION

Included herein is a non-directional pneumatic tire having a diameter and a width sufficient to support an agricultural irrigation system. The tire is preferably used in conjunction with a wheel to support the agricultural irrigation system. The tire can further include a top layer and side walls, wherein the top layer and side walls define an interior chamber when positioned on the wheel. The interior chamber can be shaped to hold a gas, such as air, to facilitate the support of irrigation system.

The tire can include an axis and a tread pattern positioned on the tire. The tread pattern includes a plurality of longitudinal protrusions positioned substantially parallel with the axis. The longitudinal protrusions preferably provide substantially the same coefficient of friction between the tire and the surface upon which the tire rotates when the tire is rotated in opposite directions with respect to the axis. The tread pattern can further include a circumferential protrusion positioned approximately at the mid point of the width of the tire.

Each longitudinal protrusion can further include a terminal end that extends toward the mid-point of the width of the tire. The circumferential protrusion can space the terminal end of each longitudinal protrusion away from the axis of the tire. Additionally, the terminal end of each longitudinal protrusion can extend past the terminal end of adjacent longitudinal protrusions. The longitudinal protrusions have a circumferential spacing between adjacent longitudinal protrusions at the equatorial plane so that no portion of one longitudinal protrusion circumferentially coincides with another.

The tire can be comprised of rubber, and can further include an anti-weathering agent. The anti-weathering agent can comprise at least 8 parts per 100 parts of the rubber of the total composition of the tire. Preferably the anti weathering agent can comprise between 8-18 parts per 100 parts of rubber. The anti weathering agent can comprise wax, an anti oxidant, resin, an anti ozonant or combinations thereof.

Also included is a non directional pneumatic tire used to support an agricultural irrigation system. The tire includes a raised tread pattern having a substantially centrally positioned circumferential lug and longitudinal lugs circumferentially positioned parallel to the axis of the tire. The longitudinal lugs preferably extend from the side walls of the tire towards the circumferential lug and include a terminal end positioned on the circumferential lug. The circumferential lug and terminal ends of the longitudinal lugs preferably provide a substantially uniform resistance between the tire and the surface upon which the tire rolls when the tire is rotated in opposite directions.

The circumferential lug and longitudinal lugs can also be positioned to increase the crown strength of the tire and to increase the traction performance and cleaning ability of tire. Additionally, the tread design can be designed such that there is a reduced contact pressure between the tire and the surface upon which it traverses.

The tire can include an anti weathering agent to increase the ozone resistance of the tire. In addition the tire can include a tread durometer of less than 55 shore A hardness.

BRIEF DESCRIPTIONS OF THE SEVERAL VIEWS OF THE DRAWINGS

FIG. 1 is a perspective view of a first embodiment of a tire made in accordance with the current disclosure.

FIG. 2 is a perspective view of a second embodiment of a tire made in accordance with the current disclosure.

DETAILED DESCRIPTION OF THE INVENTION

Figures 3, 4:
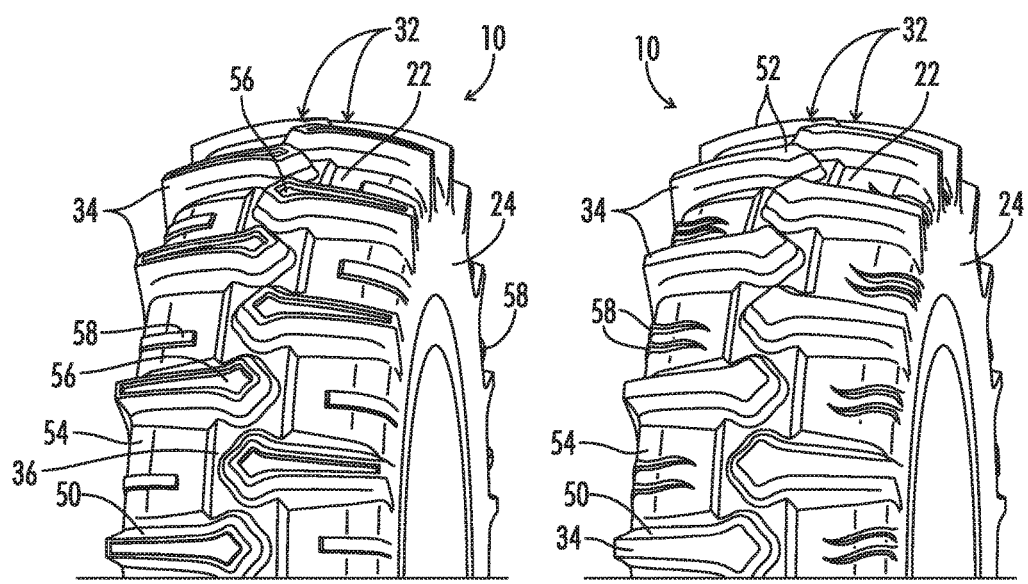
FIG. 3 is a perspective view of a third embodiment of a tire made in accordance with the current disclosure.
FIG. 4 is a perspective view of a fourth embodiment of a tire made in accordance with the current disclosure.

Referring generally to FIGS. 1-16, a tire is shown and generally designated by the numeral 10. The tire 10 is preferably used to support an agricultural irrigation system 12 as the agricultural irrigation system 12 traverses across a surface 14. The surface 14 is preferably a field in need of hydration. Tire 10 is a non-directional pneumatic tire having a diameter 16 and a width 18 sufficient to support the agricultural irrigation system 12. The tire 10 is used in connection with a wheel 20 to support the agricultural system 12 on the surface 14.

Preferably the tire 10 includes a top layer or top wall 22 and side walls 24 and 26 that define an internal chamber 28 when the tire 10 is positioned on the wheel 20. The internal chamber 28 can be shaped to hold a gas which can provide the pneumatic properties for the tire 10.

The tire 10 can include a rotational axis 30 and tread pattern 32 positioned on the tire 10. The tread pattern 32 preferably includes a plurality of longitudinal protrusions 34, which can be described as longitudinal lugs 34, positioned substantially parallel to the axis 30. Preferably the longitudinal protrusions 34 are positioned to provide substantially the same coefficient of friction between the tire 10 and the surface 14 when the tire 10 is rotated in opposite directions relative to the axis 30. This can also be described as the tire 10 being a non-directional tire.

Preferably, the tread pattern 32 includes a circumferential protrusion 36, which can also be described as a circumferential lug 36, positioned approximately at the mid-point or equatorial plane 38 of the width 18 of the tire 10. The circumferential protrusion 36 can space the longitudinal protrusions 34 away from the axis 30. More specifically, the longitudinal protrusions 34 can include a terminal end 40 which can be spaced by the circumferential protrusion 36 away from the axis 30. The terminal end 40 of each longitudinal protrusion 34 extends towards and across the mid point or equatorial plane 38 of the tire 10. This can best be seen in FIGS. 1-5.

The longitudinal protrusions 34 are arranged in first and second rows extending from the side walls 24 and 26 towards and across the mid point or equatorial plane 38 and terminating within the width of the circumferential protrusion 36. Additionally, the terminal end 40 of each longitudinal protrusion 34 can extend past the terminal end 40 of adjacent longitudinal protrusions 34 of the opposing row.

Figure 5:
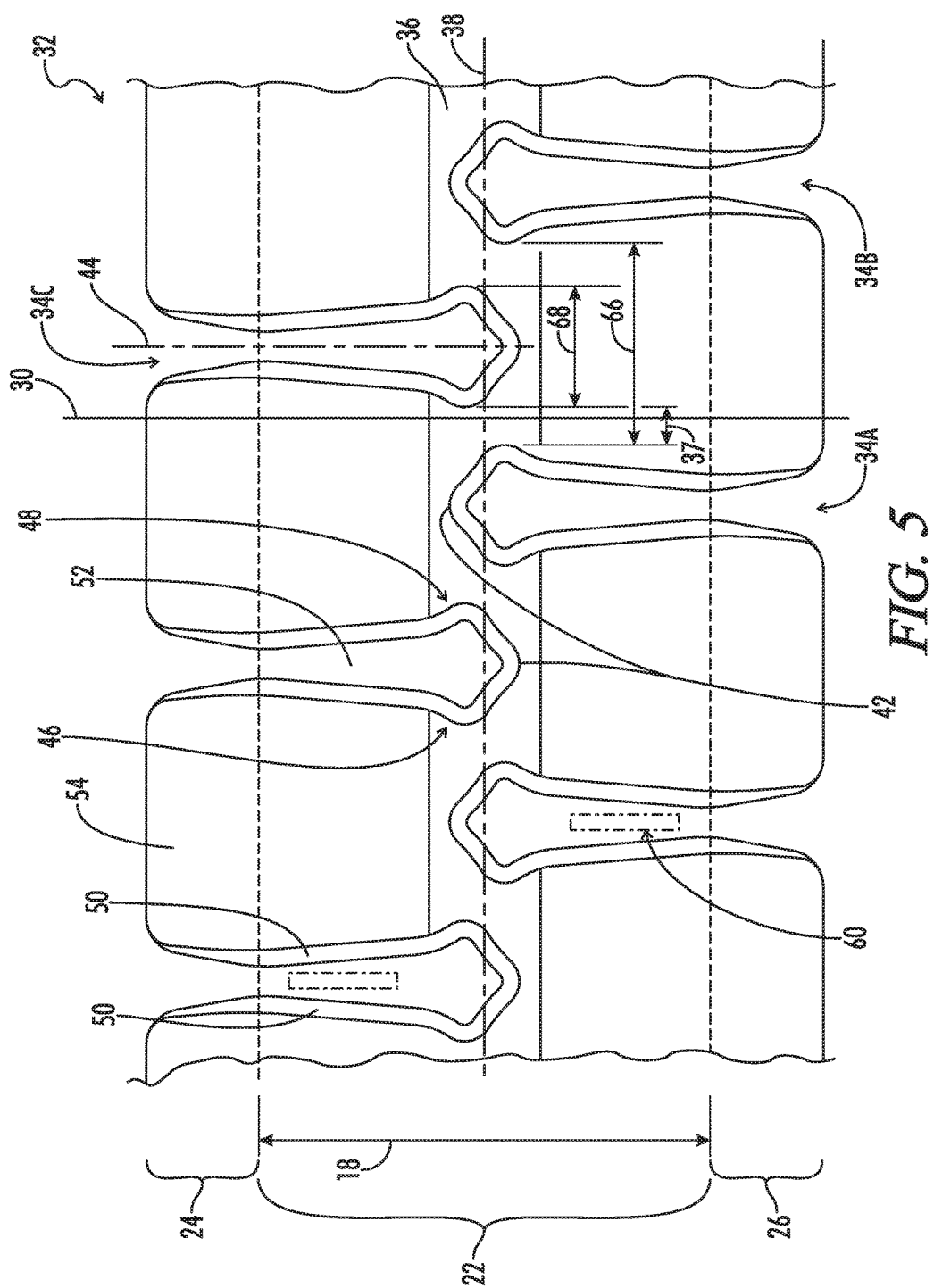
FIG. 5 is a partial plan view of the tread of the tire shown in FIG. 2.
Figure 6:
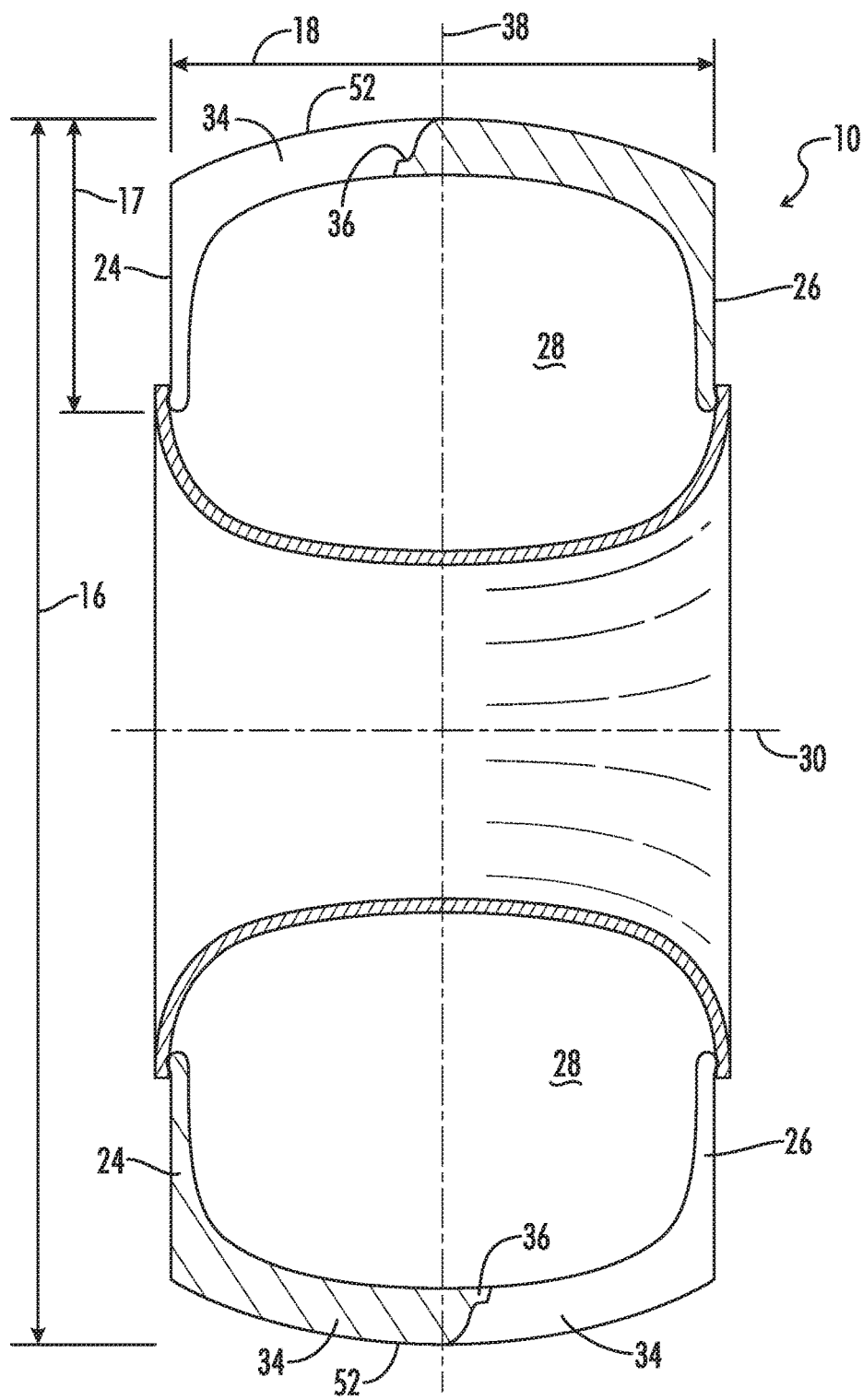
FIG. 6 is a cross sectional view of a tire made in accordance with the current disclosure showing the internal cavity formed between the side walls, top layer, and wheel.
Figure 7:
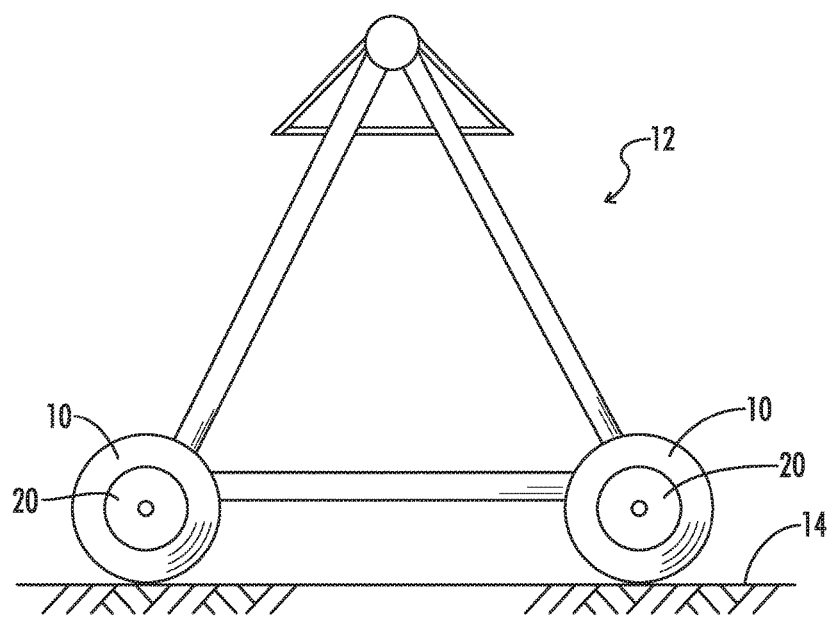
FIG. 7 is an elevation view of an example of an agricultural irrigation system supported by the current invention.

As is apparent for example in FIG. 5, the longitudinal protrusions or lugs 34 of the first and second rows circumferentially alternate with each other. There is a circumferential spacing 37 such as shown in FIG. 5 between adjacent longitudinal protrusions of opposing rows at the equatorial plane 38 of the width of the tire. Thus due to this circumferential spacing 37 no portion of one longitudinal protrusion or lug 34 circumferentially coincides with or overlaps another adjacent longitudinal protrusion or lug 34.

FIG. 5 shows a plan view of a tire with a tread pattern made in accordance with the current disclosure. The dotted lines in FIG. 5 show the approximate location of the connection line in the tire 10 between the top layer 20 and sidewalls 24 and 26.

Figure 8:
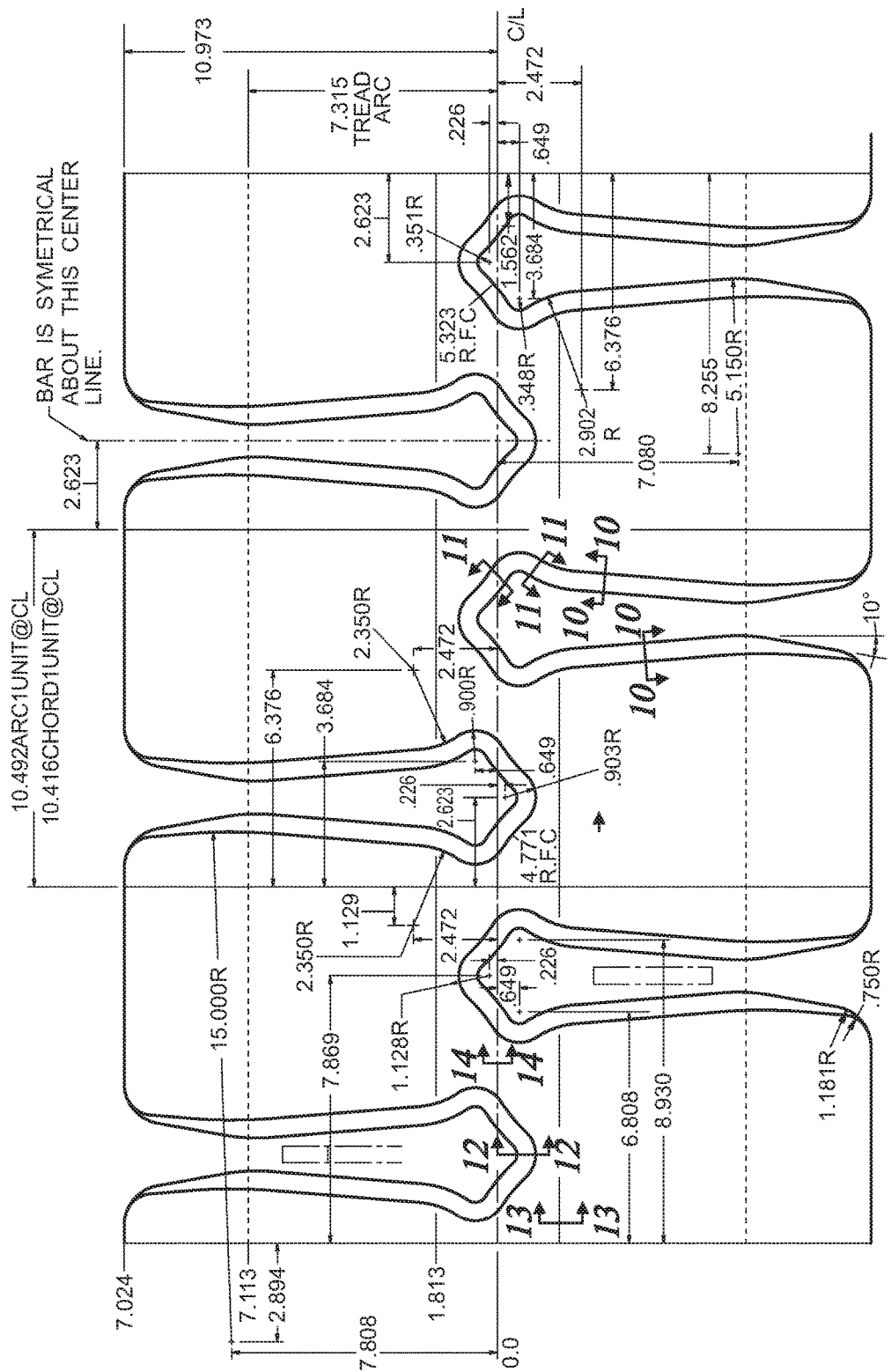
FIG. 8 is a partial plan view, similar to FIG. 5, of the tread of a tire made in accordance with the current disclosure.
Figure 9:
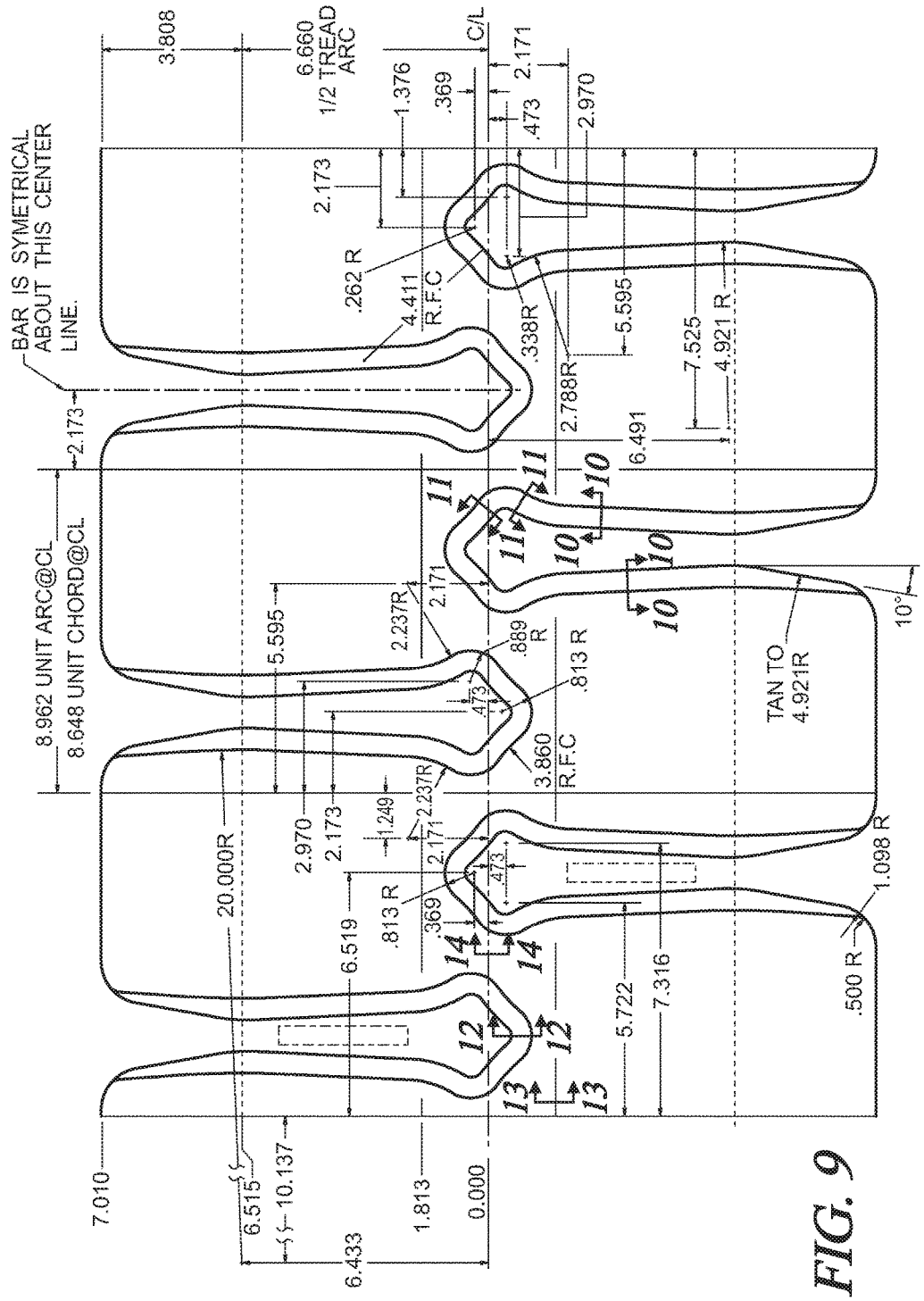
FIG. 9 is a partial plan view, similar to FIGS. 5 and 8, of the tread of a tire made in accordance with the current disclosure.

FIGS. 8 and 9 generally show a plan view of a tire with a tread pattern made in accordance with the current disclosure. FIG. 8 shows an example of the spacing of a tread pattern comprising 15 longitudinal protrusions per side of the tire (i.e. a pitch of 15) while FIG. 9 shows an example of the spacing of a tread pattern comprising 18 longitudinal protrusions per side of the tire (i.e. a pitch of 18).

Figure 10:
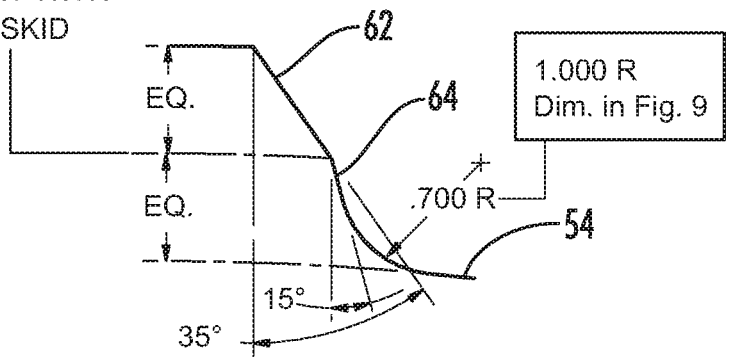
FIG. 10 is a partial cross-sectional view taken along lines 10-10 of FIG. 8 or 9.
Figure 11:
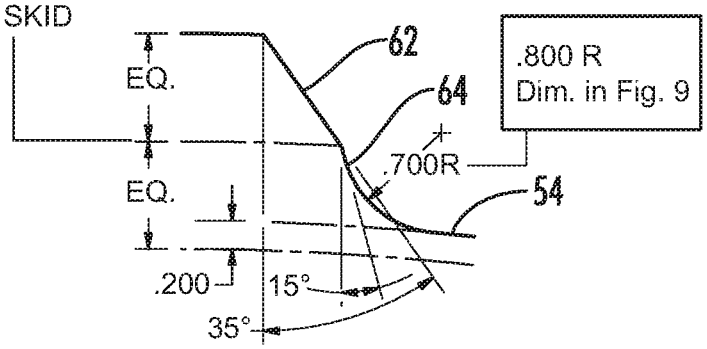
FIG. 11 is a partial cross-sectional view taken along lines 11-11 of FIG. 8 or 9.
Figure 12:
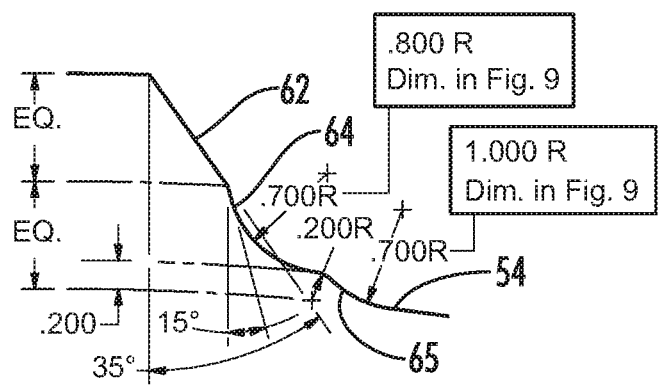
FIG. 12 is a partial cross-sectional view taken along lines 12-12 of FIG. 8 or 9.
Figure 13:
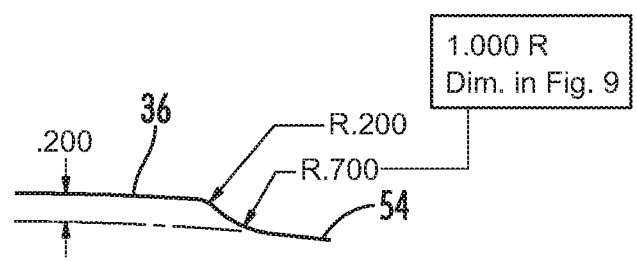
FIG. 13 is a partial cross-sectional view taken along lines 13-13 of FIG. 8 or 9.
Figure 14:
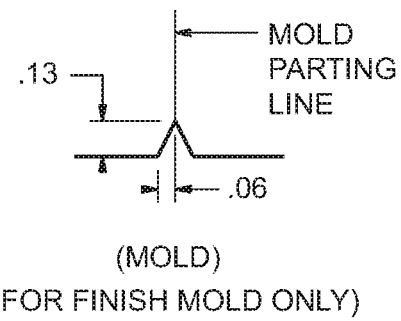
FIG. 14 is a partial cross-sectional view taken along lines 14-14 of FIG. 8 or 9.

FIGS. 10-14 generally show partial cross-sectional views taken along various lines of FIG. 8 or 9. FIGS. 10-12 show examples of the protrusion sides 50 having multiple taper sections extending between the outer and inner contact surfaces as previously described. The multiple slopes of these surfaces facilitate traction, increase crown strength, increase tire durability, and enhance cleaning ability for the tire 10.

As seen in FIGS. 3-4, the tread pattern 32 can include additional features to facilitate the performance of the tire. For example, the longitudinal lugs 34 can include a recessed area 56 used to facilitate the traction of the tire 10. Additionally, intermediary lugs 58 can be positioned between the longitudinal lugs 34. These intermediary lugs 58 can take a variety of shapes including a rib pattern as seen in FIG. 3, a wavy pattern as seen in FIG. 4, or other similar patterns used to increase the performance of the tire 10.

The protrusions 34 can also include tread bars 60 positioned substantially along the protrusion axis 44 of the longitudinal protrusions 34.

Shapes of Longitudinal Lugs

The terminal end 40 of each longitudinal protrusion 34 can comprise various shapes. For example as shown in FIG. 1, an end can be substantially round and be described as a rounded end 42. This rounded end 42 can be positioned substantially along a protrusion axis 44 (see FIG. 5) for each longitudinal protrusion 34. First and second bulges 46 and 48, which can also be described as circumferential enlargements 46 and 48, can extend from the protrusion axis 44, as best seen in FIGS. 2-5, 8 and 9. These bulges 46 and 48 can narrow to the rounded end 42. Alternately, the terminal end 40 of the longitudinal protrusions 34 can be described as being substantially spade shaped as exemplified in FIGS. 2-5.

Figure 15:
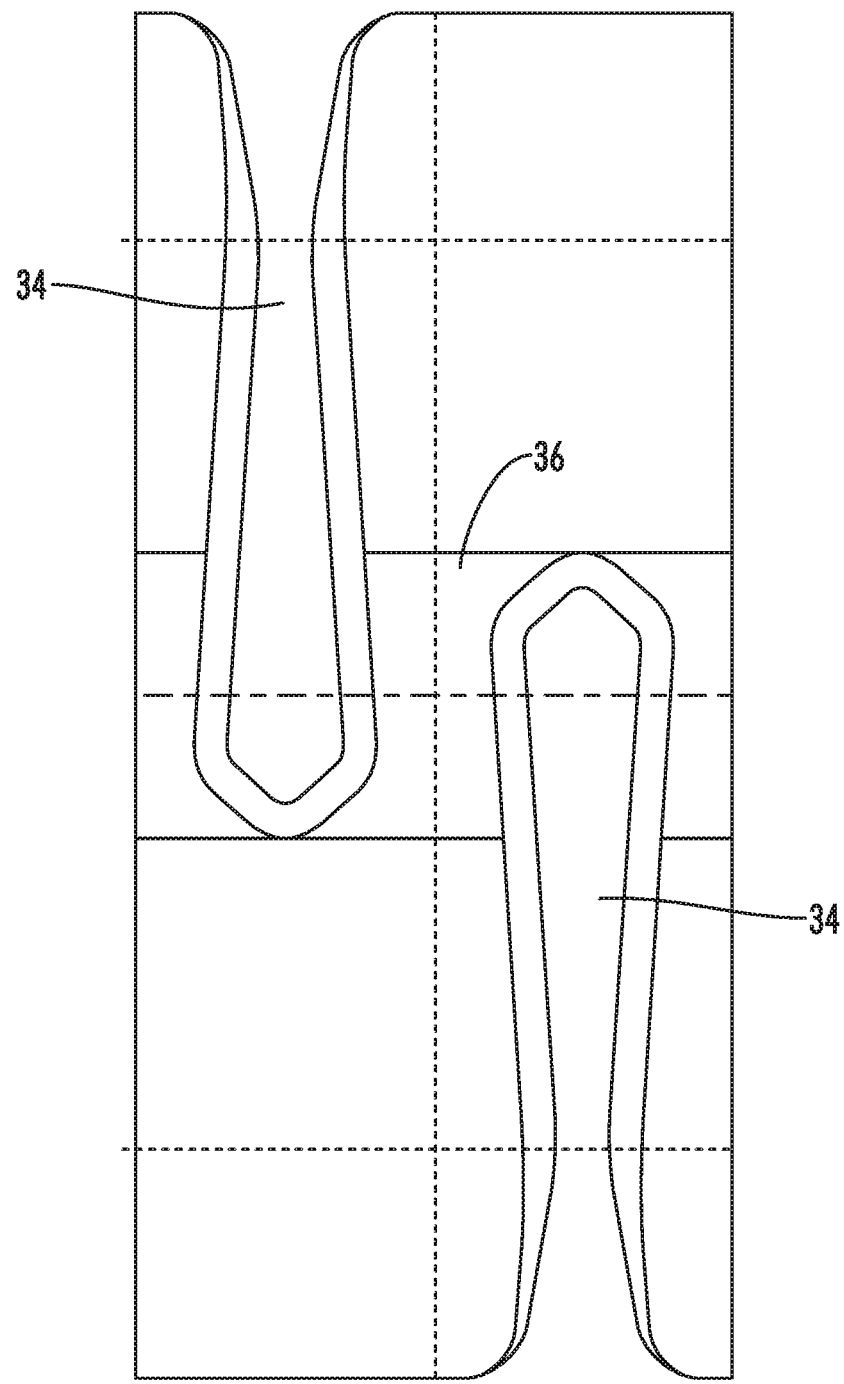
FIG. 15 is a view similar to FIG. 2 showing another alternative tread design having a different shape enlarged head on the lugs.

FIG. 15 shows still another alternative shape of enlarged head which is similar to that of FIG. 5 but does not have the distinct circumferentially extending bulges 46 and 48. Also in the design of FIG. 15 the longitudinal lugs 34 extend longitudinally to the edge of the circumferential lug 36.

Figure 16:
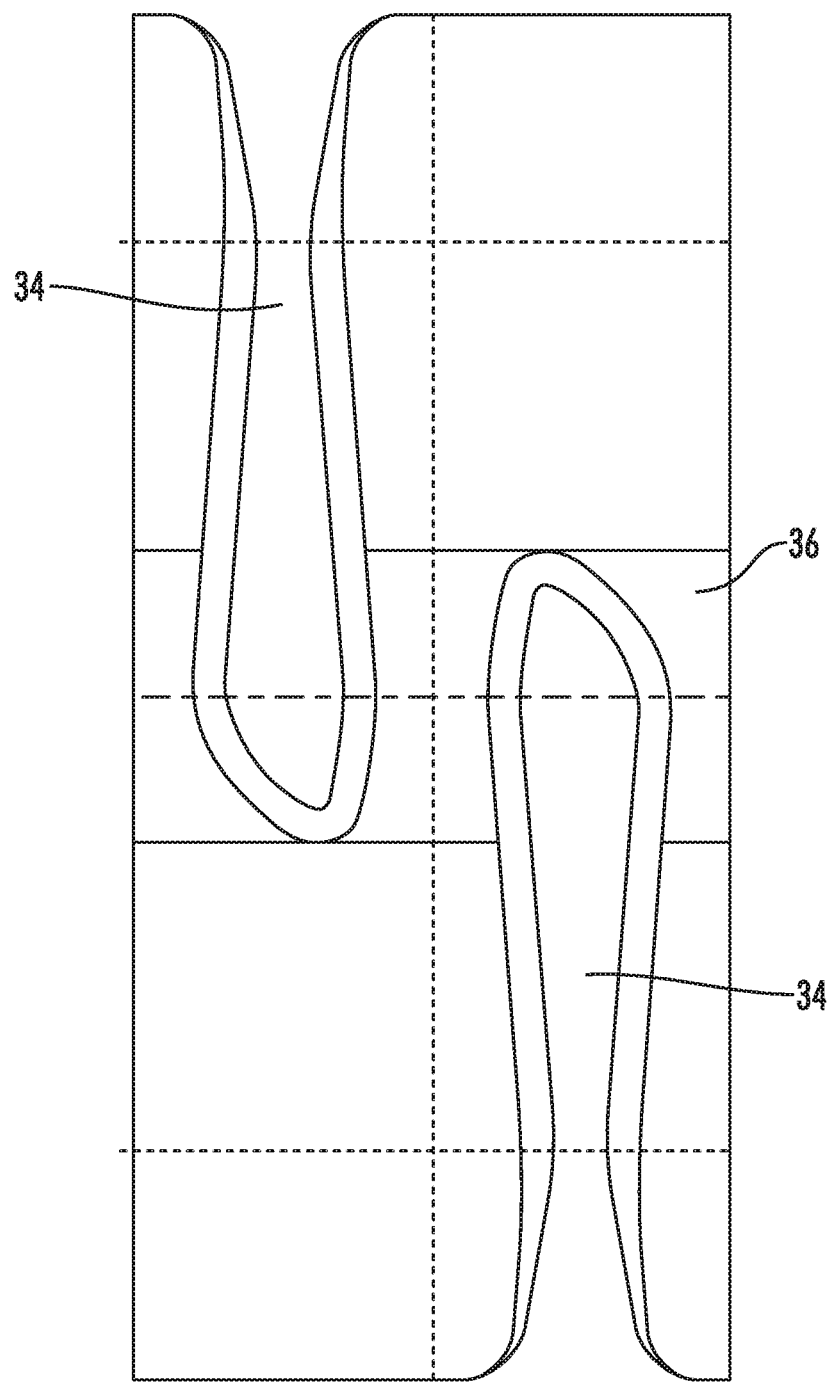
FIG. 16 is another view similar to FIG. 2 showing still another alternative tread design having a different shape enlarged head on the lugs.

In FIG. 16 still another shape of the longitudinal lugs is shown. In FIG. 16, the lugs 34 have asymmetrically shaped enlarged heads with the heads of the first row facing circumferentially in opposite directions from the heads of the second row.

These various shapes of the longitudinal protrusions 34 alone, and in combination with, the circumferential protrusion 36 facilitate increased traction performance of the tire 10. Additionally, these protrusions 34 and 36 can enhance the cleaning ability of the tire and facilitate the contact of the tire 10 with the surface 14. Additionally, the tread design, in combination with the protrusions 34 and 36, facilitate and increases crown strength in the tire 10.

Representative Dimensions

Representative dimensions for three proposed sizes of the tire 10 utilizing the design shown in FIGS. 2, 5, 8 and 9 are set forth in the following Table I. All dimensions are in inches.

TABLE I

| | 380/85D24 Champion Hydro ND | 290/85D38 Champion Hydro ND | 290/85D24 Champion Hydro ND |
|---|---|---|---|
| Diameter | 49.4 | 57.4 | 43.5 |
| Section Height | 12.7 | 9.7 | 9.7 |
| Section Width | 15.0 | 11.4 | 11.4 |
| Lug Height | 1.48 | 1.37 | 1.37 |
| Tie-Bar (Center Lug) Height | 0.2 | 0.2 | 0.2 |
| Number of Pitches | 18 | 21 | 16 |

Additionally it is noted that there is a relatively wide spacing between the lugs of each row in the circumferential direction. This is related to the tread pitch of the tire, the tread pitch being defined as the number of longitudinal lugs 34 in either one of the first and second rows. Preferably this tread pitch is in the range of from 10-25, and more preferably in the range of from 15-21. These low pitch tires having wide spaces therebetween provide increased cleaning effectiveness for use in very muddy environments encountered with irrigation tires. This is contrasted to designs having much higher pitches which might be utilized for example to provide more contact area for a tire operating under more traditional conditions.

Also, because of their use as irrigation tires, the tires of the present invention are preferably relatively large tires having an outside diameter 16 of at least about 40 inches and a tire section width 18 of at least about 10 inches.

The large spacing between adjacent lugs 34 on these relatively large tires also results in a tread pattern having a relatively low rubber to void ratio, defined as the area of the radially outer surfaces of the lugs 34, as compared to the total area across the tire width 18. For the tires of the present invention such as represented in FIG. 5 and in Table I, the rubber to void ratio over the tread width 18 is preferably less than about 20 percent, and more preferably in the range of from about 16 percent to about 20 percent.

Furthermore, these tire dimensions result in a tire 10 having an aspect ratio defined as the tire section height 17 (see FIG. 6) divided by the tire section width 18 of no greater than about 90 percent thereby providing a relatively wide tire. As can be determined from the data of Table I, the aspect ratio of each of those three tires is about 85 percent.

The Dual-Tapered Lug Sides

The longitudinal protrusions 34 can include protrusion sides 50 extending from the contact surface 52 of each protrusion 34 down to lateral grooves 54, which can be described as inner tread 54. Additionally each protrusion side 50 can be sloped from the contact surface 52 down to a lateral groove 54. The slope of each of the protrusion sides 50 can extend around and include a slope for the rounded end 42 and bulges 46 and 48 from the contact surface 52 to lateral grooves 54. This can best be seen in FIGS. 2-5, 8, and 9. The slope of these surfaces facilitates traction, increase crown strength, increase tire durability, and impediment cleaning ability for the tire 10.

For example, the inner tread 54, which can be described as an inner contact surface 54, can be defined between the protrusion sides 50 of adjacent longitudinal protrusions 34. As seen in FIGS. 10-12 the protrusion side 50 of each longitudinal protrusion 34 can include a first taper 62 extending from the contact surface 52 and a different sloped second taper surface 64 extending from the first taper surface 62 to the inner tread 54. A third taper 65 can be positioned between the second taper surface 64 and the inner tread 54. These multiple (dual, bi-, or otherwise) tapered longitudinal protrusions 34 facilitate an increased durability in the tire 10 and tread pattern 32 by preventing cracking in the longitudinal protrusions 34, especially near the inner tread 54. The dual taper edge also reduces the rubber volume required for the lugs. The dual slope of the protrusion sides 50 also facilitates improved traction and cleaning ability for the tire 10 through the movement of loose sections of the ground surface 14 when the tire traverses the surface 14.

Each longitudinal protrusion 34 can be described as being positioned opposite the location of an inner tread 54 and circumferentially inside oppositely positioned adjacent longitudinal protrusions 34. Alternately described, as indicated on FIG. 5, the first and second bulges 46 and 48 of adjacent longitudinal protrusions 34 (i.e. first and second longitudinal protrusions 34A and 34B) can define a chord length 66 between the adjacent longitudinal protrusions 34A and 34B. A longitudinal protrusion 34C can be positioned opposite the chord length 66 such that the width 68 of the oppositely positioned longitudinal protrusion 34C is less than the chord length 66. This results in the circumferential spacing 37 between the enlarged heads of adjacent lugs 34 as shown in FIG. 5.

Anti Weathering Agents

In a preferred embodiment, the tire 10 comprises rubber and an anti-weathering agent. The anti-weathering agent preferably comprises at least 8 parts per 100 parts of rubber in the composition of the tire 10. In a more preferred embodiment, the anti-weathering agent comprises between 8-18 parts per 100 parts of rubber. The anti-weathering agent can comprise elements such as wax, an anti oxidant, resin, an anti ozonant or combination thereof to provide ozone resistance and prolong the useful life of the tire 10.

Thus, although there have been described particular embodiments of the present invention of a new and useful Irrigation Tire, it is not intended that such references be construed as limitations upon the scope of this invention except as set forth in the following claims.

What is claimed is:

1. A non-directional pneumatic tire for supporting an agricultural irrigation system, comprising:
   first and second sidewalls and a radially outer wall defining an internal inflation chamber;
   a non-directional tread pattern defined on the tire and including a plurality of longitudinal protrusions, each longitudinal protrusion having a protrusion axis substantially parallel to a rotational axis of the tire and each longitudinal protrusion being circumferentially symmetric about its protrusion axis; and
   the longitudinal protrusions being arranged in a first row extending from the first sidewall toward and across an equatorial plane of the tire and a second row extending from the second sidewall toward and across the equatorial plane of the tire, the longitudinal protrusions of the first and second rows circumferentially alternating with each other and there being a circumferential spacing between adjacent longitudinal protrusions so that no portion of one longitudinal protrusion extends circumferentially past any portion of an adjacent longitudinal protrusion; and
   wherein each longitudinal protrusion includes a contact surface having first and second edges extending in a distal direction from the respective sidewall and defining first and second circumferentially symmetrical bulges on circumferentially opposite sides of the protrusion axis;
   wherein the circumferentially symmetrical bulges each include a convex circular arc shaped bulge portion having a radius of curvature; and
   wherein an end portion of each of the first and second edges extending beyond the convex circular arc shaped bulge portions and located on a distal side of the convex circular arc shaped bulge portions includes a concave portion of the respective edge.

2. The tire of claim 1, wherein the concave portions of the end portions of the first and second edges are symmetric with each other about the protrusion axis.

3. The tire of claim 2, wherein the concave portions of the end portions of the first and second edges are separated by a convex edge portion.

4. The tire of claim 1, wherein:
   a free end of each longitudinal protrusion is rounded.

5. The tire of claim 1, wherein an aspect ratio of the tire defined as tire section height divided by tire section width is no greater than about 90%, thereby providing a relatively wide tire.

6. The tire of claim 1, having a tire section width of at least 10 inches.

7. The tire of claim 6, having an outside diameter of at least 40 inches.

8. The tire of claim 1, having a tread pitch in the range of 10 to 25, the tread pitch being defined as the number of longitudinal protrusions in one of said first and second rows.

9. The tire of claim 8, wherein the tread pitch is in the range of 15 to 21.

10. The tire of claim 8, wherein an outside diameter of the tire is at least about 40 inches.

11. A non-directional pneumatic tire for supporting an agricultural irrigation system, comprising:
   first and second sidewalls and a radially outer wall defining an internal inflation chamber;
   a non-directional tread pattern defined on the tire and including a plurality of longitudinal protrusions, each longitudinal protrusion having a protrusion axis substantially parallel to a rotational axis of the tire and each longitudinal protrusion being circumferentially symmetric about its protrusion axis; and
   the longitudinal protrusions being arranged in a first row extending from the first sidewall toward and across an equatorial plane of the tire and a second row extending from the second sidewall toward and across the equatorial plane of the tire, the longitudinal protrusions of the first and second rows circumferentially alternating with each other and there being a circumferential spacing between adjacent longitudinal protrusions so that no portion of one longitudinal protrusion extends circumferentially past any portion of an adjacent longitudinal protrusion; and
   wherein each longitudinal protrusion includes a contact surface having first and second edges extending from the respective sidewall and defining first and second circumferentially symmetrical bulges on circumferentially opposite sides of the protrusion axis;

wherein the circumferentially symmetrical bulges each include a convex circular arc shaped bulge portion having a radius of curvature; and wherein a free end of each longitudinal protrusion is rounded in a convex circular arc shaped end portion having a radius of curvature; and wherein the convex circular arc shaped bulge portion of each of the bulges is separated from the convex circular arc shaped end portion of the respective free end by a concave portion of the respective edge.

12. The tire of claim 11, wherein:

the first and second edges of the contact surface each include an axially outer straight portion extending from the respective sidewall, then include a concave curved portion curving away from the protrusion axis, then include a respective one of the convex circular arc shaped bulge portions defining a respective one of the circumferentially symmetrical bulges.

13. The tire of claim 12, wherein:

all the way to the free end of each longitudinal protrusion from each of the circumferentially symmetrical bulges each of the first and second edges incline toward the protrusion axis.

14. The tire of claim 11, wherein:

the first and second edges of the contact surface continuously diverge from each other beginning at the respective sidewall and include a concave curved portion curving away from the protrusion axis, then include a respective one of the convex circular arc shaped bulge portions defining a respective one of the circumferentially symmetrical bulges.

15. The tire of claim 11, wherein the tread pattern has a relatively low rubber to void ratio over a tire width of less than about 20%.

16. The tire of claim 11, wherein an aspect ratio of the tire defined as tire section height divided by tire section width is no greater than about 90%, thereby providing a relatively wide tire.

17. The tire of claim 16, having an outside diameter of at least 40 inches.

18. The tire of claim 11, having a tire section width of at least 10 inches.

19. The tire of claim 11, having a tread pitch in the range of 10 to 25, the tread pitch being defined as the number of longitudinal protrusions in one of said first and second rows.

20. The tire of claim 19, wherein the tread pitch is in the range of 15 to 21.

* * * * *